United States Patent
Hwang (10) Patent No.: US 6,737,845 B2
(45) Date of Patent: May 18, 2004

(54) CURRENT INRUSH LIMITING AND BLEED RESISTOR CURRENT INHIBITING IN A SWITCHING POWER CONVERTER

(75) Inventor: Jeffrey H. Hwang, Saratoga, CA (US)

(73) Assignee: Champion Microelectronic Corp., Hsinchu (TW)

( * ) Notice: Subject to any disclaimer, the term of this patent is extended or adjusted under 35 U.S.C. 154(b) by 0 days.

(21) Appl. No.: 10/177,558

(22) Filed: Jun. 21, 2002

(65) Prior Publication Data

US 2002/0196644 A1 Dec. 26, 2002

Related U.S. Application Data

(60) Provisional application No. 60/300,492, filed on Jun. 21, 2001.

(51) Int. Cl.$^7$ ................................. G05F 1/56
(52) U.S. Cl. ................ 323/284; 323/222; 323/285; 323/901; 323/908
(58) Field of Search .................... 323/222, 284, 323/285, 901, 908

(56) References Cited

U.S. PATENT DOCUMENTS

| | | | |
|---|---|---|---|
| 3,646,439 A | 2/1972 | Broski | 323/242 |
| 4,754,388 A | 6/1988 | Pospisil | |
| 5,010,293 A | 4/1991 | Ellersick | |
| 5,012,401 A | 4/1991 | Barlage | |
| 5,396,165 A | 3/1995 | Hwang et al. | 323/210 |
| 5,459,652 A * | 10/1995 | Faulk | 323/901 |
| 5,565,761 A | 10/1996 | Hwang | 323/222 |
| 5,570,276 A | 10/1996 | Cuk et al. | 363/16 |
| 5,592,128 A | 1/1997 | Hwang | 331/61 |
| 5,742,151 A | 4/1998 | Hwang | 323/222 |
| 5,747,977 A | 5/1998 | Hwang | 323/284 |
| 5,798,635 A | 8/1998 | Hwang et al. | 323/222 |
| 5,804,950 A | 9/1998 | Hwang et al. | 323/222 |
| 5,818,207 A | 10/1998 | Hwang | 323/288 |
| 5,831,418 A | 11/1998 | Kitagawa | 323/222 |
| 5,859,527 A | 1/1999 | Cook | |
| 5,894,243 A | 4/1999 | Hwang | 327/540 |
| 5,903,138 A | 5/1999 | Hwang et al. | 323/266 |
| 5,912,549 A | 6/1999 | Farrington et al. | 323/207 |
| 5,912,552 A | 6/1999 | Tateishi | 323/285 |
| 5,914,591 A | 6/1999 | Yasuda et al. | |
| 5,930,130 A * | 7/1999 | Katyl et al. | 323/222 |
| 6,060,867 A | 5/2000 | Farrington et al. | 323/222 |
| 6,091,233 A | 7/2000 | Hwang et al. | 323/222 |
| 6,140,808 A | 10/2000 | Massie | 323/284 |
| 6,163,712 A | 12/2000 | Winkler et al. | |
| 6,166,528 A | 12/2000 | Rossetti et al. | 323/283 |
| 6,215,290 B1 | 4/2001 | Yang et al. | 323/282 |
| 6,307,356 B1 | 10/2001 | Dwelley | 323/282 |
| 6,346,778 B1 | 2/2002 | Mason et al. | |
| 6,356,468 B1 | 3/2002 | Havukainen et al. | |
| 6,426,885 B1 | 7/2002 | Sekiguchi et al. | |
| 6,445,165 B1 * | 9/2002 | Malik et al. | 323/908 |

* cited by examiner

*Primary Examiner*—Jeffrey Sterrett
(74) *Attorney, Agent, or Firm*—Derek J. Westberg (57) ABSTRACT

A current inrush limiting technique for a switching power converter. In one aspect, a switching power converter includes a main power switch and a current sensor. When the input current exceeds a first threshold, the main power switch is opened. When the input current exceeds a second threshold, higher than the first threshold, a current-limiting resistance is coupled to receive the input current. Accordingly, the input current is limited in two stages by two different techniques. In another aspect, a bleed resistor receives current from a power source for providing power to a controller for the power converter. After start-up, such as when an output voltage of the power converter is available to provide power to the controller, the current-limiting resistor is shorted and the bleed resistor is effectively removed. A single pin of an integrated circuit controller controls shorting of the current-limiting resistor and removal of the bleed resistor.

39 Claims, 12 Drawing Sheets

CURRENT INRUSH LIMITING AND BLEED RESISTOR CURRENT INHIBITING IN A SWITCHING POWER CONVERTER

This application claims the benefit of U.S. Provisional Application Ser. No. 60/300,492, filed Jun. 21, 2001.

FIELD OF THE INVENTION

The present invention relates to switching power converters. More particularly, the present invention relates to limiting current inrush upon start-up of a switching power converter.

BACKGROUND OF THE INVENTION

In a typical switching power converter, a duty cycle of a main power switch is controlled in response to a level of an output voltage developed by the power converter in order to regulate the output voltage. When power converter starts up, the output voltage is initially nearly zero. Accordingly, a large voltage may be applied across elements of the converter, resulting in a large inrush current. As a result, the current level may cause a circuit breaker that supplies power to the converter to trip or may cause damage to the converter itself.

A conventional technique for limiting the inrush current includes positioning a current-limiting resistor to receive the input current upon start-up and then shorting the resistor with a switch. Another technique includes placing a current-limiting resistor in parallel with a current-sensing resistor that is positioned to receive the input current. Upon start up, a switch in series with the sensing resistor directs the input current through the larger, current-limiting resistance. Then, the switch directs the input current through the sensing resistor.

A drawback to these techniques is that a dedicated pin would be required to implement them using an integrated circuit controller for the power converter.

In addition, in a conventional switching power converter, control circuitry, such as integrated circuit controller may obtain its operating power from an output of the power converter. During start-up, however, the output is not yet available. Thus, a bleed resistor is sometimes provided to obtain power from an input power source for the power converter, such as the AC supply.

A drawback to this technique is that during normal operation, the bleed resistor continues to draw power from the source, wasting energy. This is especially disadvantageous for devices for which a low energy consumption rating is desired.

An alternate technique involves shorting the bleed the resistor with a switch under normal operating conditions. However, this requires a dedicated pin to control the switch when the using an integrated circuit controller for the power converter.

Therefore, what is needed are improved techniques for preventing inrush current and for preventing power dissipation in a bleed resistor that do not suffer from the aforementioned drawbacks. It is to these ends that the present invention is directed.

SUMMARY OF THE INVENTION

The present invention is a current inrush limiting technique for a switching power converter. In one aspect of the invention, a switching power converter includes a main power switch and a current sensor, such as a sensing resistor, that forms a signal representative of an input current. When the input current exceeds a first threshold, the main power switch is opened. When the input current exceeds a second threshold, higher than the first threshold, a current-limiting resistance is coupled to receive the input current. Accordingly, the input current is limited in two stages by two different techniques.

In accordance with another aspect of the invention, a current sensor determines when a power converter is in a start-up mode. In response, a current-limiting resistor is coupled to receive the input current. In addition, a bleed resistor receives current from a power source for providing power to a controller for the power converter. After start-up, such as when an output voltage of the power converter is available to provide power to the controller, the current-limiting resistor is shorted and the bleed resistor is effectively removed. A single pin of an integrated circuit controller controls shorting of the current-limiting resistor and removal of the bleed resistor.

DETAILED DESCRIPTION OF A PREFERRED EMBODIMENT

Figure 1A:
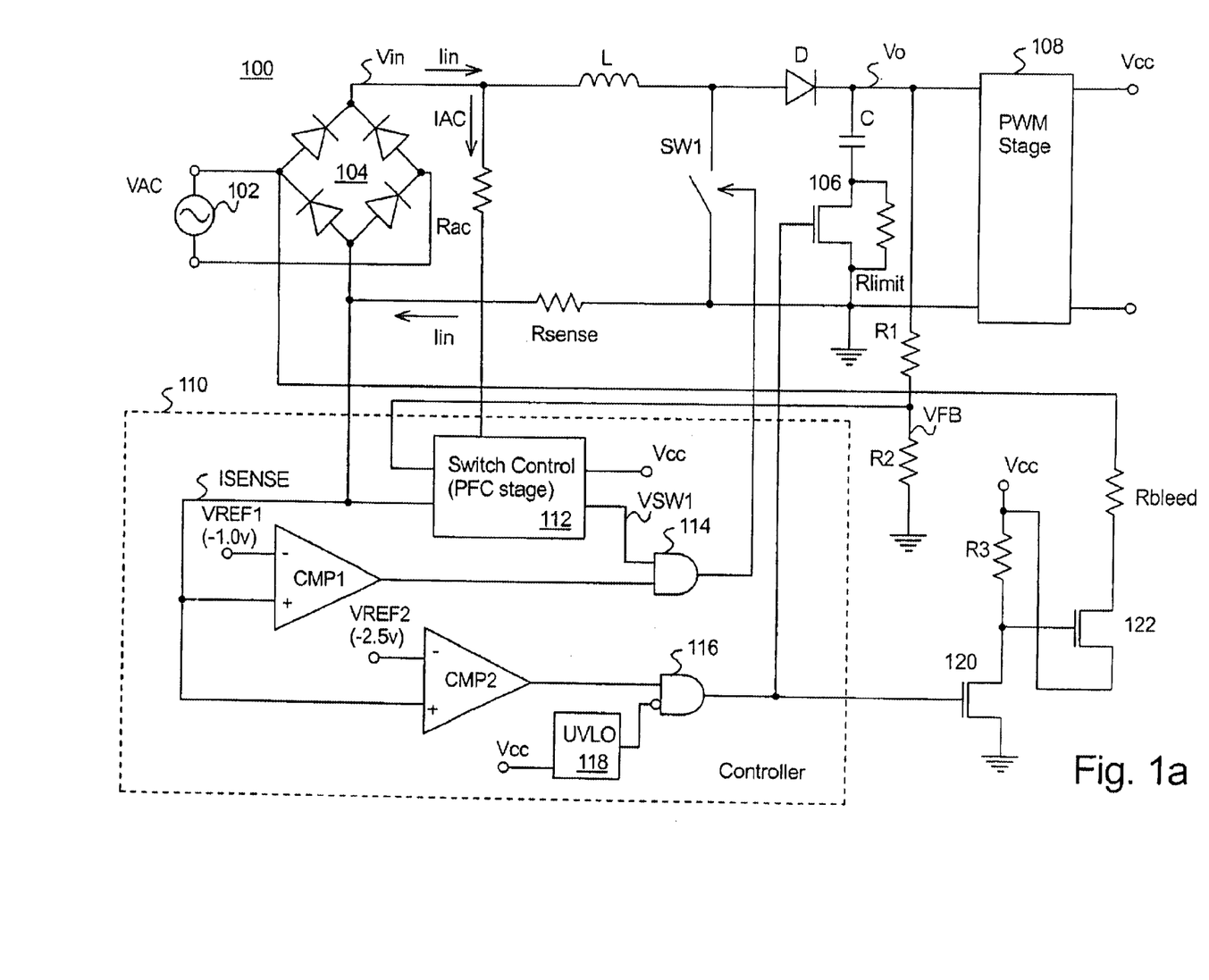
FIGS. 1a–c illustrate schematic diagrams of a power converter in accordance with an aspect of the present invention.
Figure 1B:
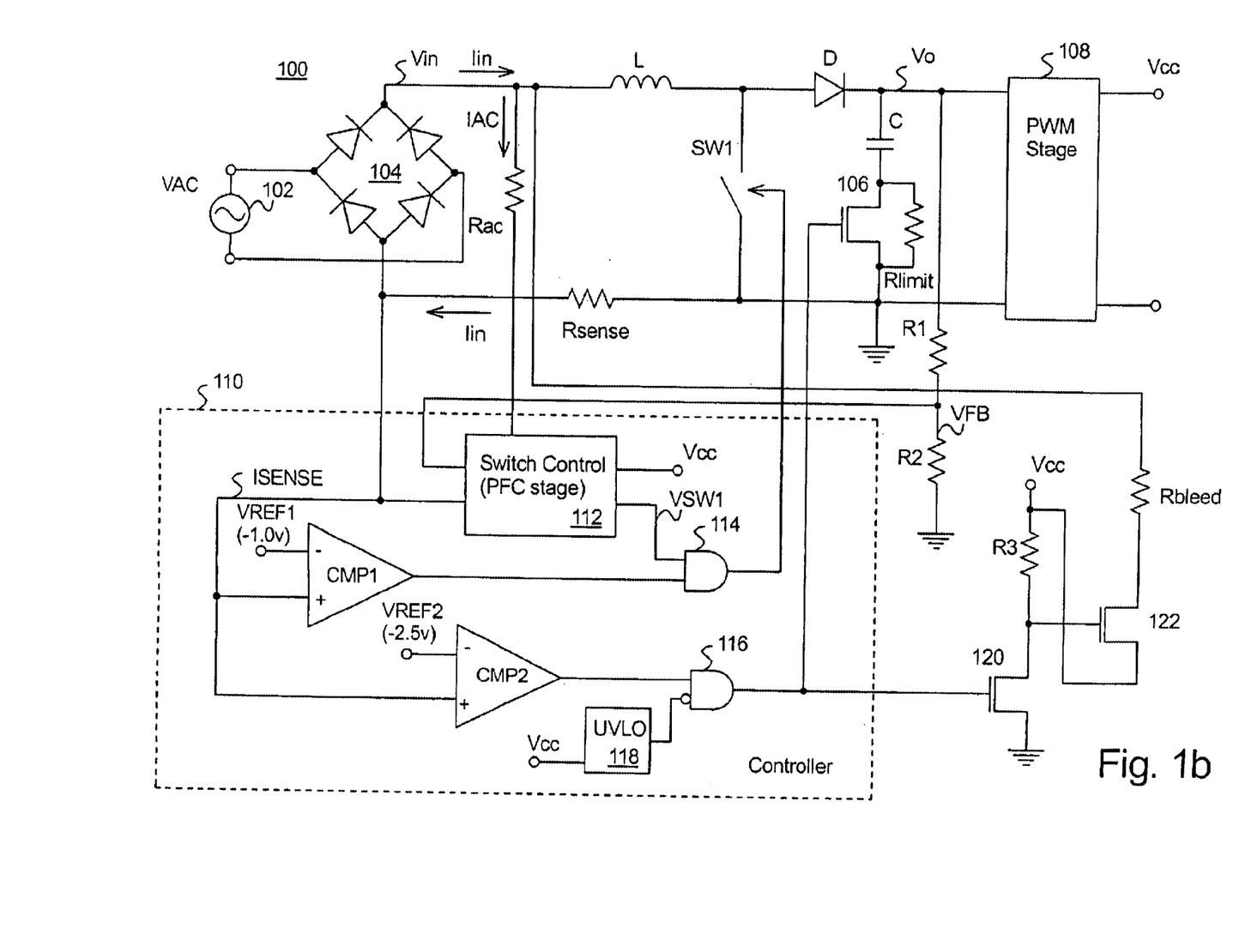
Figure 1C:
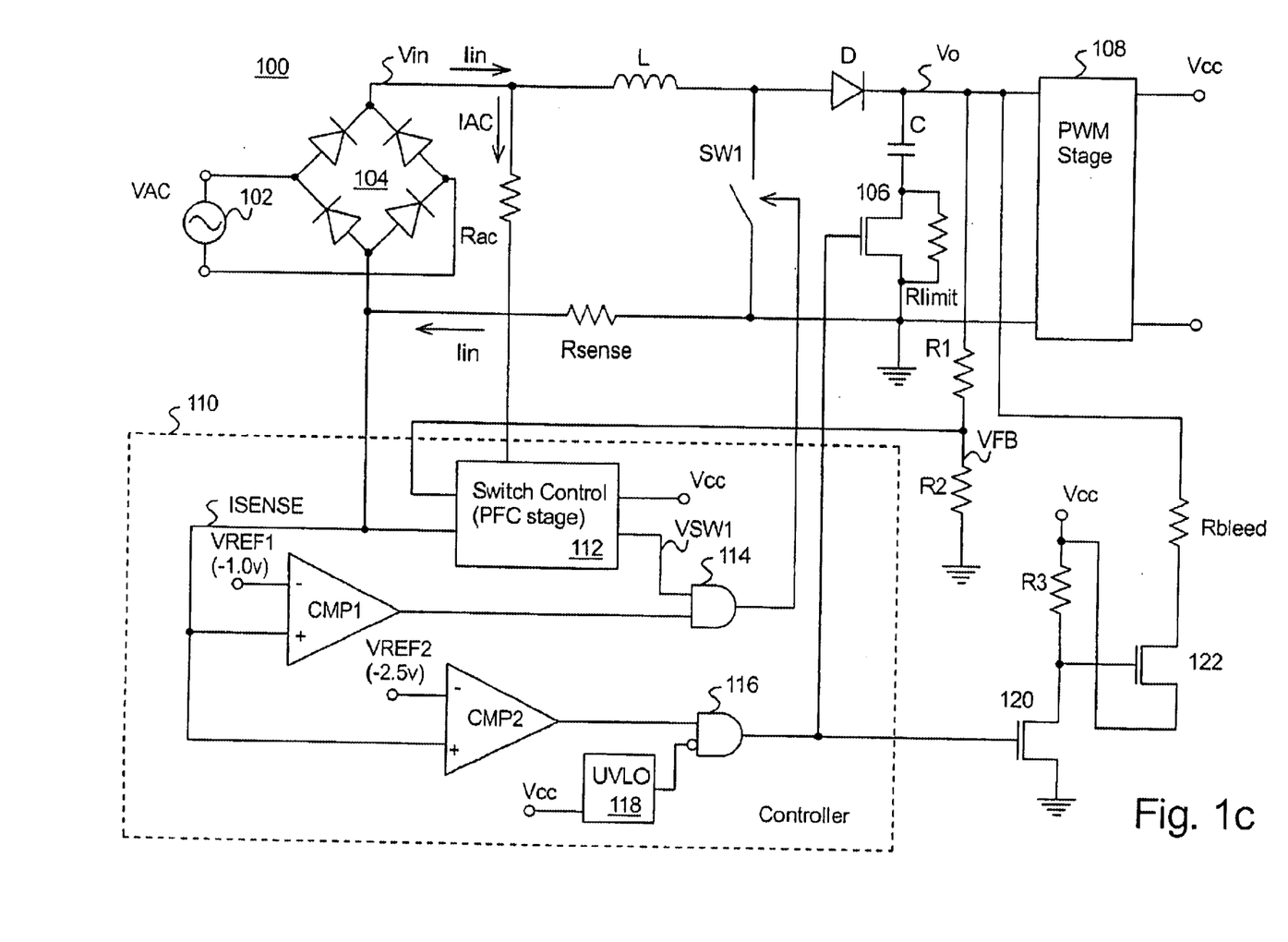

FIGS. 1a–c illustrates a schematic diagram of a power converter 100 in accordance with an aspect of the present invention. A power supply 102, such an AC power source, may provide a signal VAC that is coupled across input terminals of a bridge rectifier 104. A first output terminal of the rectifier 104 may be coupled to a first terminal of an inductor L. A second terminal of the inductor L may be coupled to an anode of a rectifying diode D and to a first terminal of a switch SW1 (e.g., a MOSFET). A cathode of the diode D may be coupled to a first terminal of a capacitor C.

A second terminal of the capacitor C may be coupled to a first terminal of a resistor Rlimit. A second output terminal of the rectifier 104 may be coupled to a first terminal of a current-sensing resistor Rsense. A second terminal of the current-sensing resistor Rsense, a second terminal of the switch SW1 and a second terminal of the resistor Rlimit may be coupled to a ground node. A transistor switch 106 may be coupled across the resistor Rlimit. Collectively, the inductor L, switch SW1, diode D, and capacitor C form a power factor correction (PFC) stage of the power converter 100.

Under normal operating conditions, the switch 106 is closed. When the switch SW1 is closed, current from the rectifier 104 charges the inductor L with energy. When the switch SW1 is opened, energy stored in the inductor L is discharged into the capacitor C. An output voltage Vo formed by the PFC stage across capacitor C may provide power to a load. As illustrated in FIGS. 1a–c an exemplary load may be a pulse-width modulation (PWM) stage 108 of the converter 100 in which the output voltage Vo forms an input to the PWM stage 108. A regulated output may be formed by the PWM stage 108.

A controller 110, such as an integrated circuit controller, may control the switch SW1. As shown in FIGS. 1a–c a supply voltage Vcc may be used to provide power to circuitry of the controller 110. The PWM stage 108 may form a supply voltage Vcc at its output. It will be apparent, however, that the supply voltage Vcc may be formed in another manner. For example, the inductor L may serve as a primary winding of a transformer (not shown) such that current in the inductor L induces current in a secondary winding of the transformer. This induced current may then provide power to the controller 112. Further, a regulator (not shown) may be included in the controller 110 for supplying power to other circuitry of the controller 110.

The controller 110 controls the switch SW1 so as to regulate an output voltage Vo formed at the first terminal of a capacitor C. In one aspect, the controller 110 may include a conventional PFC controller 112 which maintains the input current Iin substantially in phase with the input voltage VAC, in addition to regulating the output voltage Vo. The PFC controller 112 may receive a signal ISENSE formed at the first terminal of the sensing resistor Rsense that is representative of the input current Iin and a signal VFB that is representative of the output voltage Vo.

The output voltage feedback signal VFB may be formed by applying the output voltage Vo to a first terminal of a resistor R1. A second terminal of the resistor R1 may be coupled to a first terminal of a resistor R2. A second terminal of the resistor R2 may be coupled to a ground node. Thus, the resistors R1 and R2 form a resistive divider. The signal VFB may be formed at the intermediate terminal of the resistive divider and coupled to the switch controller 112.

In addition, a first terminal of a resistor Rac may be coupled to a first output terminal of the rectifier 104. A second terminal of the resistor Rac may be coupled to the switch controller 112. A current IAC passes through the resistor Rac and, thus, forms a signal that is representative of the input voltage Vin. This signal may be used by the switch controller 112 to help ensure that the input current Iin follows the input voltage Vin. A signal VSW1 formed by the PFC switch controller 112 controls the switch SW1 by regulating its duty cycle.

Note that signal ISENSE is generally a negative voltage level since the current Iin causes a voltage drop across the resistor Rsense. In the event that the signal ISENSE exceeds (i.e. is more negative than) a first predetermined threshold, this indicates an excessive level of input current Iin. For example, this may occur if a load, such as the PWM stage 108, draws an excessive current or experiences a fault. When this occurs, the switch SW1 may be held open so as to limit the current Iin. To accomplish this, the signal ISENSE may be coupled to a first input of a comparator CMP1. A reference voltage VREF1 (e.g., −1.0 volts) may be coupled to a second input of the comparator CMP1. An output of the comparator CMP1 may be coupled to a first input of a logic AND gate 114. The output VSW1 of the PFC switch controller 112 may be coupled to a second input of the logic AND gate 114. An output of the logic AND gate 114 may be coupled to control the switch SW1.

Thus, when the level of ISENSE is higher than the level of VREF1, the output of the comparator CMP1 is a logic high voltage. This allows the logic AND gate 114 to pass the signal VSW1 such the switch SW1 is opened and closed in accordance with the switch control signal VSW1. However, when the input current Iin increases such that the level of ISENSE is lower than the level of REF1, the output of the comparator CMP1 is a logic low voltage. This prevents the logic AND gate 114 from passing the signal VSW1 to the switch SW1. Accordingly, operation of the switch SW1 halts.

In the event the signal ISENSE exceeds a second predetermined threshold, this indicates an even higher level of input current Iin than necessary to trigger the comparator CMP1. For example, during start-up when the output voltage Vo is zero or nearly zero, a large voltage may be applied across the inductor L, resulting in a large input current. This is also referred to as "inrush" current that occurs upon the application of VAC to the PFC stage prior to the output voltage Vo being developed to significant level. Under these conditions, the switch 106 may be opened and the current-limiting resistor Rlimit coupled to receive the input current. As a result, the input current Iin is limited by the resistor Rlimit.

To accomplish this current limiting, the signal ISENSE may be coupled to a first input of a comparator CMP2. A reference voltage (e.g., −2.5 volts) may be coupled to a second input of the comparator CMP2. An output of the comparator CMP2 may be coupled to control the switch 106 via a logic AND gate 116. More particularly, the output of the comparator CMP2 may be coupled to a first input of the logic AND gate 116. An output of an under voltage lockout (UVLO) 118 may be coupled to a second (inverting) input of the logic AND gate 116. An output of the logic AND gate 116 may be coupled to control the switch 106. Thus, when the output of the AND gate 116 is a logic high voltage, the switch 106 is opened, causing the input current Iin to generate a voltage across the resistor Rlimit, which tends to limit the input current Iin.

Also upon start-up, the level of the voltage Vcc may be too low to operate the controller 110 reliably. Accordingly, a bleed resistor Rbleed may provide current from the input supply VAC to power circuits of the controller 110 until the level of Vcc is sufficient to provide power to circuitry of the controller 110. A first terminal of the bleed resistor Rbleed may be coupled to a terminal of the supply 102, shown in FIG. 1a, to an output terminal of the rectifier 104, as shown in FIG. 1b, or to the first terminal of the capacitor C, as shown in FIG. 1c. A second terminal the resistor Rbleed may be coupled to provide power to the controller 110 via a transistor 122.

Once the level of Vcc is sufficient to provide power to the controller 100, the current through the bleed resistor Rbleed is no longer necessary. Rather, this current can contribute to inefficiency in the converter 100. Accordingly, in one embodiment of the invention, the output of the logic AND gate 116 may also be coupled to interrupt the current through the bleed resistor Rbleed.

More particularly, the UVLO 118 may have logic low voltage output until the level of Vcc rises to sufficient level (e.g., a predetermined level of 13 volts, where Vcc is nominally 15 volts) to operate circuits of the controller 110. Thus, the output of the UVLO 118 may be combined with the output of the comparator CMP1 by the AND gate 116. Also, the output of the logic AND gate 116 may be coupled to a gate of a transistor 120. A source of the transistor 120 may be coupled to a ground node, while a drain of the transistor 120 may be coupled to a first terminal of a resistor R3 and to a gate of a transistor 122. When the output of the AND gate 116 is a logic high voltage, the transistor switch 106 is open, while the transistor 120 is on (closed). As a result, the transistor 122 is closed. Thus, current passes through the bleed resistor Rbleed and the transistor 122 to provide power to the controller 110.

However, when the input current Iin is reduced such that the signal ISENSE causes the output of the comparator CMP2 to change to a logic low voltage and the supply voltage Vcc is reached the predetermined level, the output of the AND gate 116 changes to a logic low voltage. As a result, the switch 106 is closed, which shorts the resistor Rlimit, while the switch 122 is opened, which interrupts the current flowing through the bleed resistor Rbleed. Under these conditions, power for the controller 110 may be provided by switching operation of the converter 100, rather than by the bleed resistor Rbleed. For example, the Vcc supply may be provided by current induced by current in the inductor L or by the output of the PWM stage of the controller 110.

Note that because the logic gate 116 performs the logic "AND" operation, the output of the comparator CMP2 must be a logic high voltage and the output of the UVLO 118 must be a logic low voltage for the switch 106 to be opened and the switches 120 and 122 to be closed. In other words, the input current Iin must be exceed the predetermined threshold set by VREF2 and the Vcc supply level must be below the predetermined threshold set by the UVLO for the input current Iin to be limited by the resistor Rlimit and for the current through the bleed resistor Rbleed to be enabled.

Alternately, the logic gate 116 may be configured to perform a logic "OR" operation. In that case, if the output of the comparator CMP2 is a logic high voltage (indicating that the input current Iin exceeds the threshold set by VREF2) or the output of the UVLO 118 is a logic low voltage (indicating the Vcc supply level is below the threshold set by the UVLO 118), then the input current Iin may be inhibited by the resistor Rlimit and the current through the bleed resistor Rbleed may be enabled.

Thus, a single output of the controller 110 (e.g., at the output of the logic gate 116) may control both the shorting of the current-limiting resistor and removal of the bleed resistor. Accordingly, a single pin of an integrated circuit controller may control shorting of the current-limiting resistor and removal of the bleed resistor. An advantage of the invention is that the number of pins required of the controller is minimized.

Figure 2A:
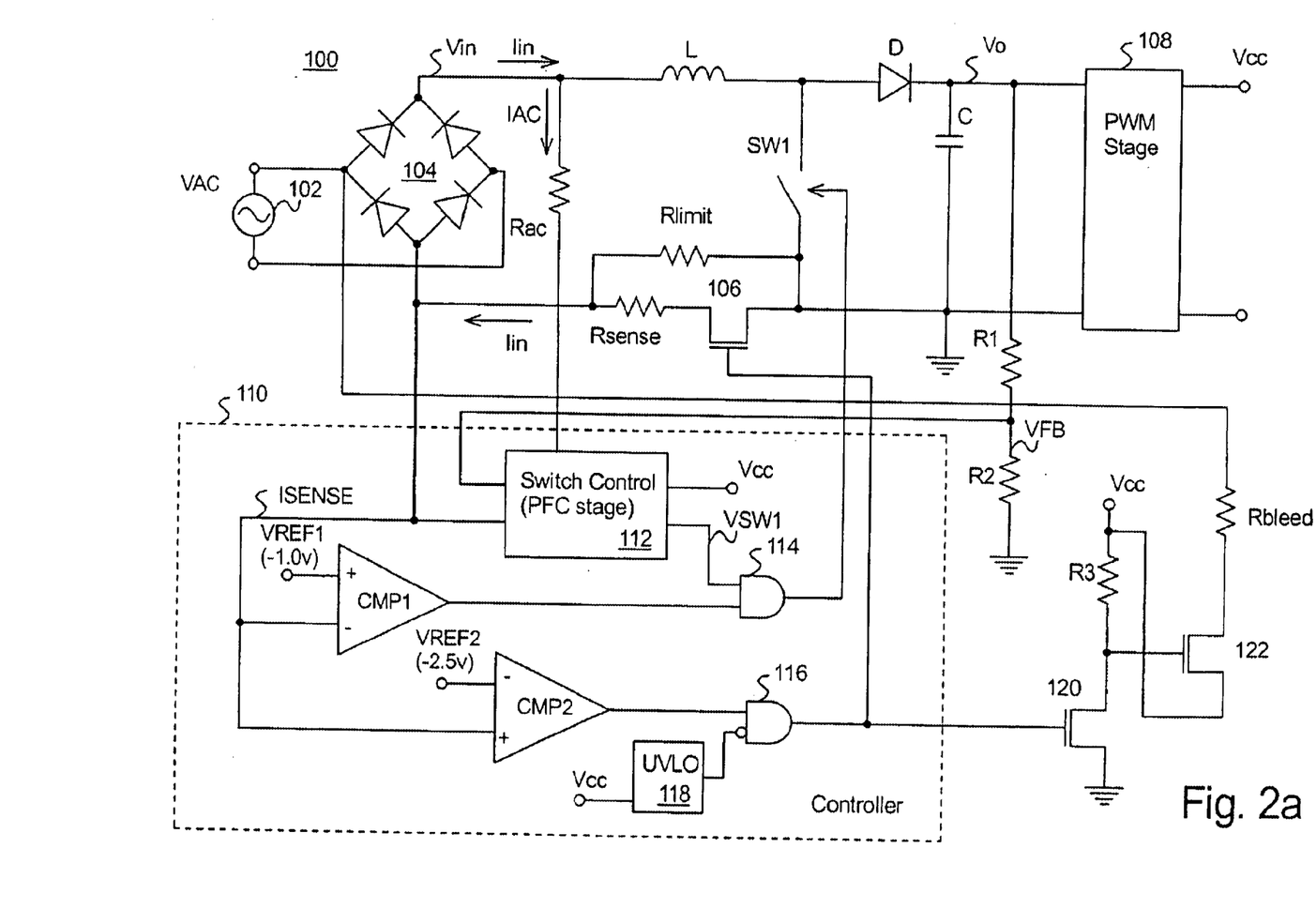
FIGS. 2a–c illustrate schematic diagrams of alternate embodiments of the power converter of FIGS. 1a–c in accordance with an aspect of the present invention.
Figure 2B:
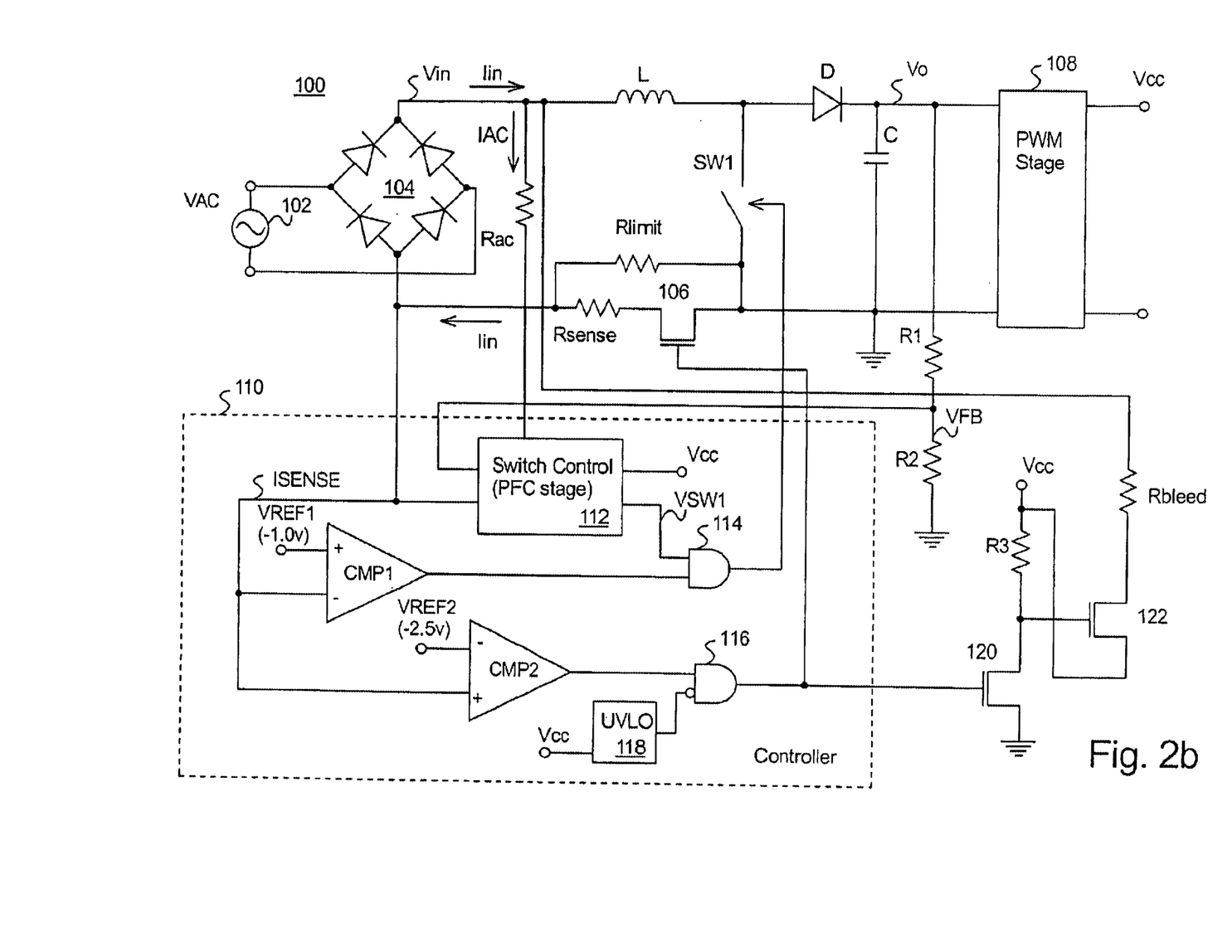
Figure 2C:
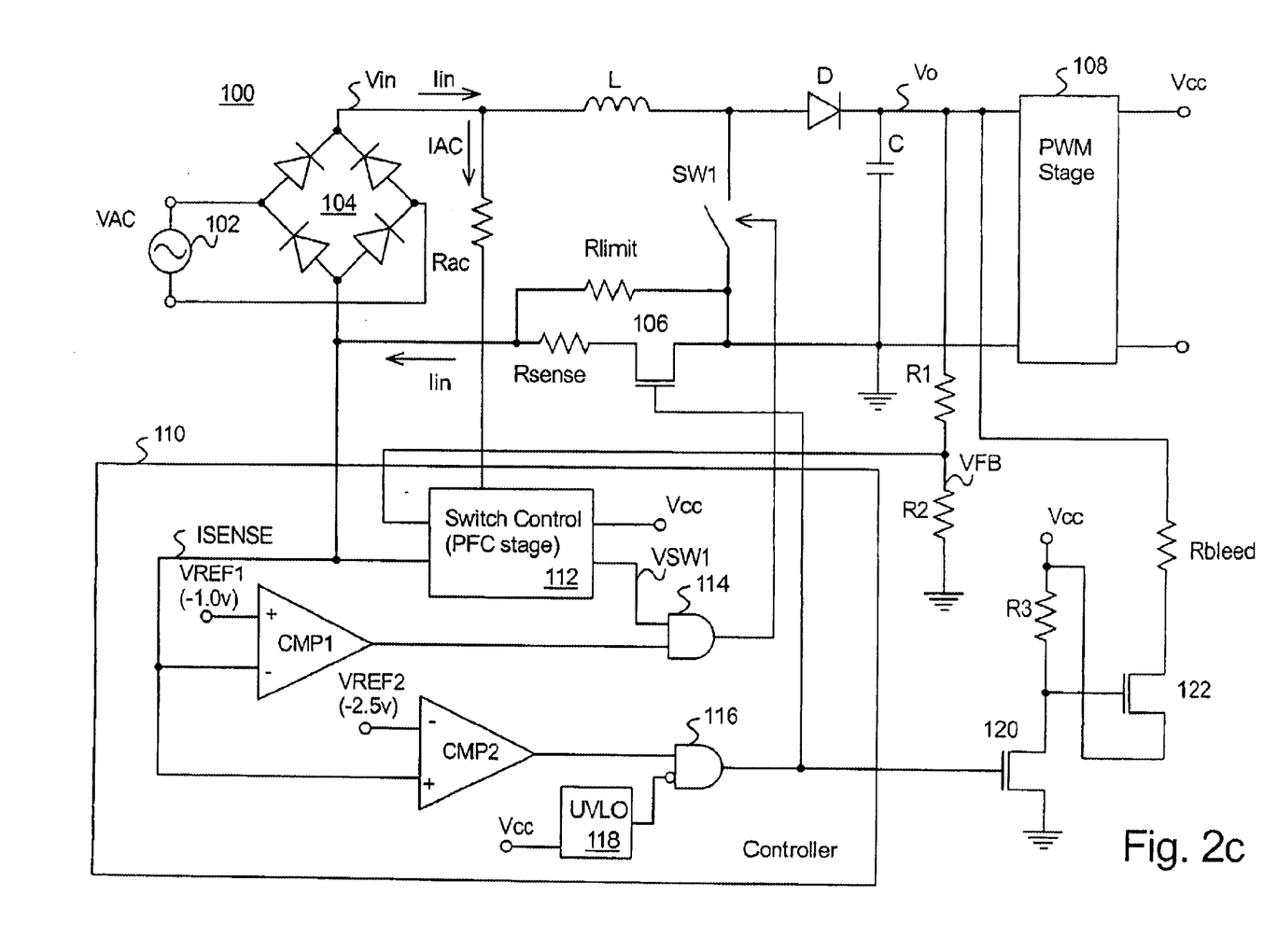

FIGS. 2a–c illustrate schematic diagrams of alternate embodiments of the power converter 100 of FIGS. 1a–c in accordance with an aspect of the present invention. FIGS. 2a–c differs from FIGS. 1a–c in that the current-limiting resistor Rlimit is in parallel with the current-sensing resistor Rsense and the transistor 106 is in series with the resistor Rsense. When the transistor 106 is off, It acts as a diode clamp. As a result, most of the input current passes through the current-limiting resistor Rlimit. When the transistor 106 is on, most of the input current Iin passes through the current-sensing resistor Rsense. It will be apparent that other modifications may be made to the embodiments illustrated herein.

Figure 3:
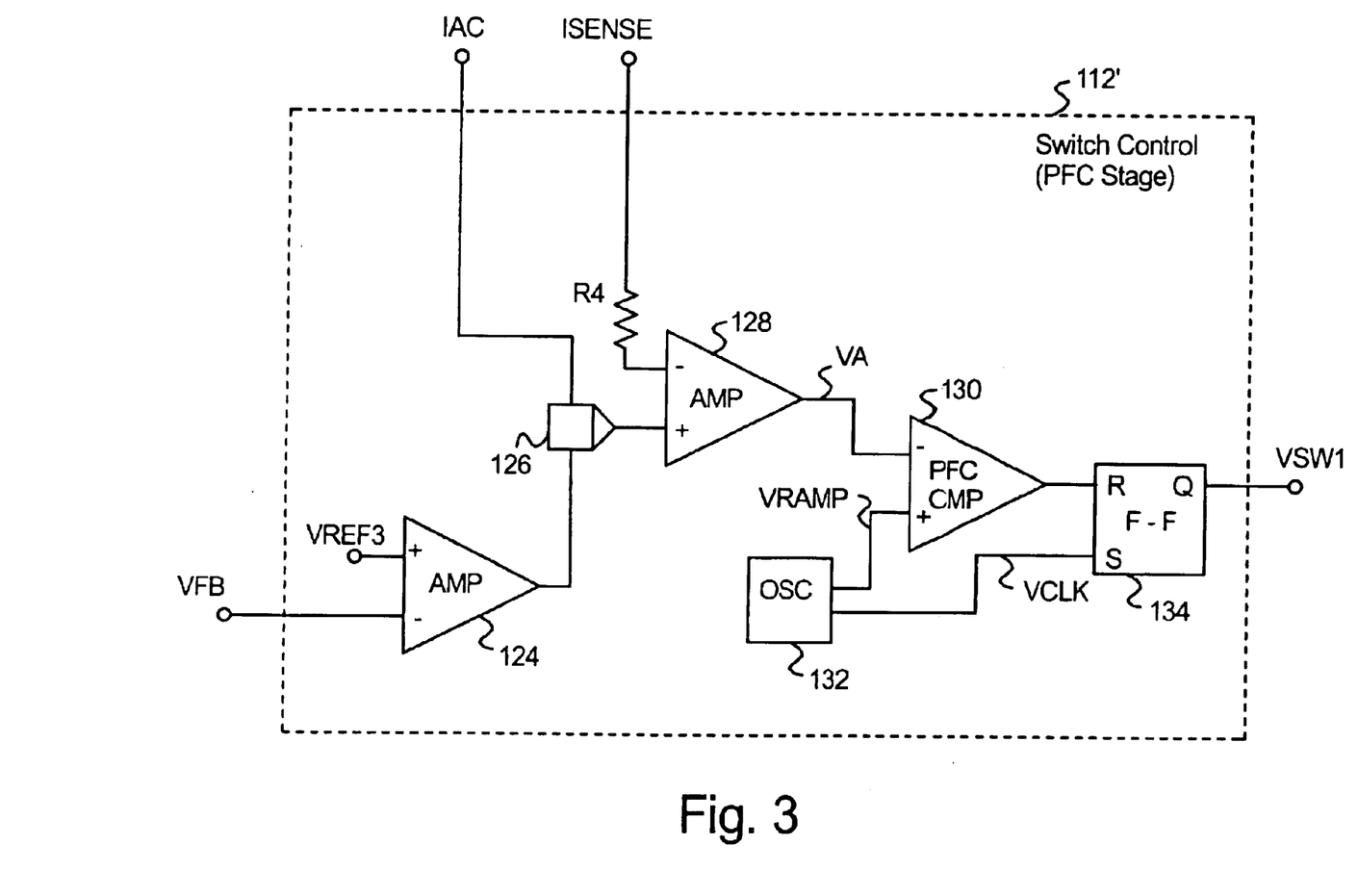
FIG. 3 illustrates a schematic diagram of a controller for the power converter of FIGS. 1a–c or 2a–c in accordance with an aspect of the present invention.

FIG. 3 illustrates a schematic diagram of an exemplary controller 112 for the power converter of FIGS. 1a–c or 2a–c in accordance with an aspect of the present invention. The controller 112 uses average current-mode control to adjust the switching duty cycle of the switch SW1. The output voltage sensing signal VFB may be coupled to a first input of an amplifier 124. A second input of the amplifier 124 may be coupled to receive a reference voltage VREF3. An output of the amplifier 124 forms an error signal which is representative of a difference between the output voltage Vo and a desired level for the output voltage Vo. The error signal may be coupled to a first input of a multiplier 126. The input voltage sensing signal IAC may be coupled to a second input of the multiplier 126.

An output of the multiplier 126 may be coupled to a first input terminal of an amplifier 128. The input current sensing signal ISENSE may be coupled to a second input of the amplifier 128 via a resistor R4. An output of the error amplifier 128 may be coupled to a first input terminal of a modulating comparator 130. An oscillator 132 may form a clock signal VCLK and a linear periodic ramp signal VRAMP that is synchronized to the clock signal VCLK. The ramp signal VRAMP may be coupled to a second input terminal of the modulating comparator 130. The ramp output of the oscillator 132 may be formed, for example, by charging a capacitor (not shown) with a constant current. An output of the modulating comparator 130 may be coupled as an input R of a flip-flop 134. The clock output VCLK of the oscillator 132 may be coupled as an input S of the flip-flop 134. An output Q of the flip-flop 134 may form the switch control signal VSW1.

The signal output from the amplifier 128 modulates up and down. When compared to the linear ramp signal from the oscillator 132, this adjusts the switching duty cycle. Thus, the amplifier 128 adjusts the switching duty cycle under closed loop control to maintain a voltage differential across its inputs to nearly zero volts. This forces the input current Iin to follow the waveform of the rectified sine wave of the input voltage Vin. The current control loop and the power delivery circuitry must have at least enough bandwidth to follow this waveform. It will be apparent that configuration of the controller 112 is exemplary and that modifications may be made.

Figure 4:
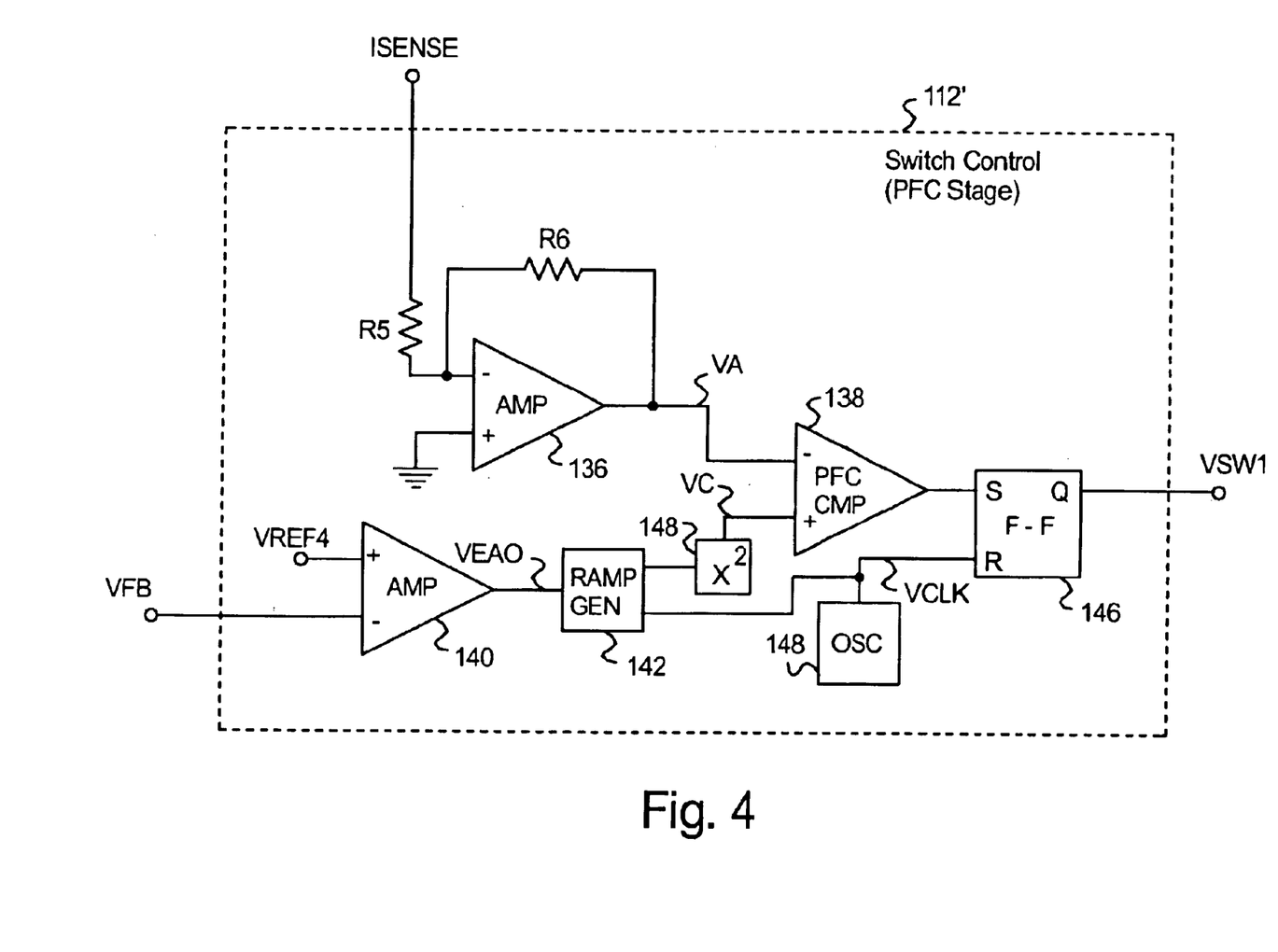
FIG. 4 illustrates a schematic diagram of an alternate embodiment of a controller for the power converter of FIGS. 1a–c or 2a–c in accordance with an aspect of the present invention.

FIG. 4 illustrates a schematic diagram of an alternate embodiment of a controller 112' for the power converter of FIGS. 1a–c and 2a–c in accordance with an aspect of the invention. The controller 112' uses input current shaping to adjust the duty cycle of the switch SW1. The current sensing signal ISENSE is coupled to a first of a resistor R5. A second terminal of the resistor R5 may be coupled to the first input of an amplifier 136 and to a first terminal of a resistor R6. A second terminal of the resistor R6 may be coupled to the output of the amplifier 136, while a second input of the amplifier 136 may be coupled to a ground node. A signal VA formed at the output of the amplifier 136 is representative of the input current Iin. The signal VA may be coupled to a first input of a comparator 138.

The voltage sensing signal VFB may be coupled to a first input terminal of an amplifier 140. A second input terminal of the amplifier 140 may be coupled to receive a reference voltage VREF4. An output of the amplifier 140 forms an error signal VEAO which is representative of a difference between the output voltage Vo and a desired level for the output voltage Vo.

A ramp generator 142 receives the error signal VEAO as an input and integrates the signal VEAO. Thus, the slope of a periodic ramp signal formed by the ramp generator 142 depends on the then-current level of the error signal VEAO. The signal from the ramp generator 142 is then applied to a squaring element 144. An output of the squaring element is applied to the second input terminal of the comparator 138.

An output of the comparator 138 may be coupled to a set input S of a flip-flop or latch 146. An oscillator 148 may form a clock signal VCLK, which is coupled to a reset input of the flip-flop 144. A Q output of the flip-flop 146 may form the switch control signal VSW1 which controls the duty cycle of the switch SW1 and SW2.

The signal VSW1 may be reset to a logical low voltage level upon a leading edge of each pulse in the clock signal VCLK. When the signal VC exceeds the signal VA, the output of the comparator 138 may set the flip-flop 146 such that the switch control signal VSW1 returns to a logical high voltage level. Thus, the duty cycle of the switch SW1 is controlled with negative feedback to maintain the input current Iin in phase with the input voltage Vin and to regulate the output voltage Vo. It will be apparent that leading or trailing edge modulation techniques may be utilized and that other types of modulation may be used, such as frequency modulation. Unlike the average current-mode controller illustrated in FIG. 3, the input voltage sensing signal IAC is not required. Accordingly, the resistor Rac may be omitted.

Other switching power supplies that perform power factor correction are described in: U.S. Pat. No. 5,804,950, entitled, "Input Current Modulation for Power Factor Correction;" U.S. Pat. No. 5,742,151, entitled, "Input Current Shaping Technique and Low Pin Count for PFC-PWM Boost Converter;" U.S. Pat. No. 5,798,635, entitled, "One Pin Error Amplifier and Switched Soft Start for an Eight Pin PFC-PWM Combination Integrated Circuit Converter Controller;" and co-pending U.S. patent application Ser. No. 10/159,142, filed May 31, 2002, and entitled, "Power Factor Correction with Carrier Control and Input Voltage Sensing" the contents of all of which are hereby incorporated by reference.

Figure 5A:
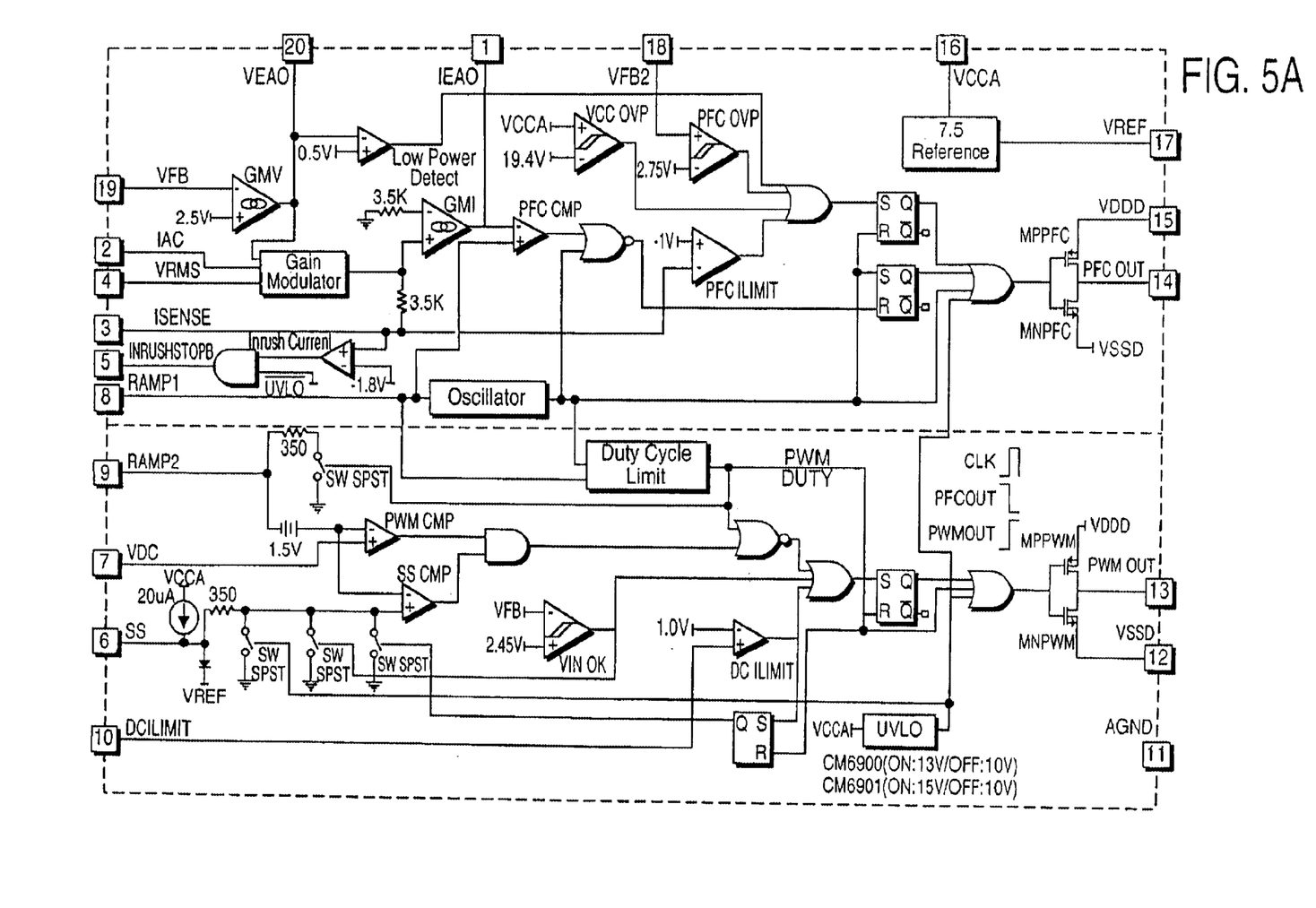
FIGS. 5a and 5b illustrate a schematic diagram of a two-stage power factor correction and pulse width modulation power converter in accordance with an aspect of the present invention.
Figures 5B, 5B:
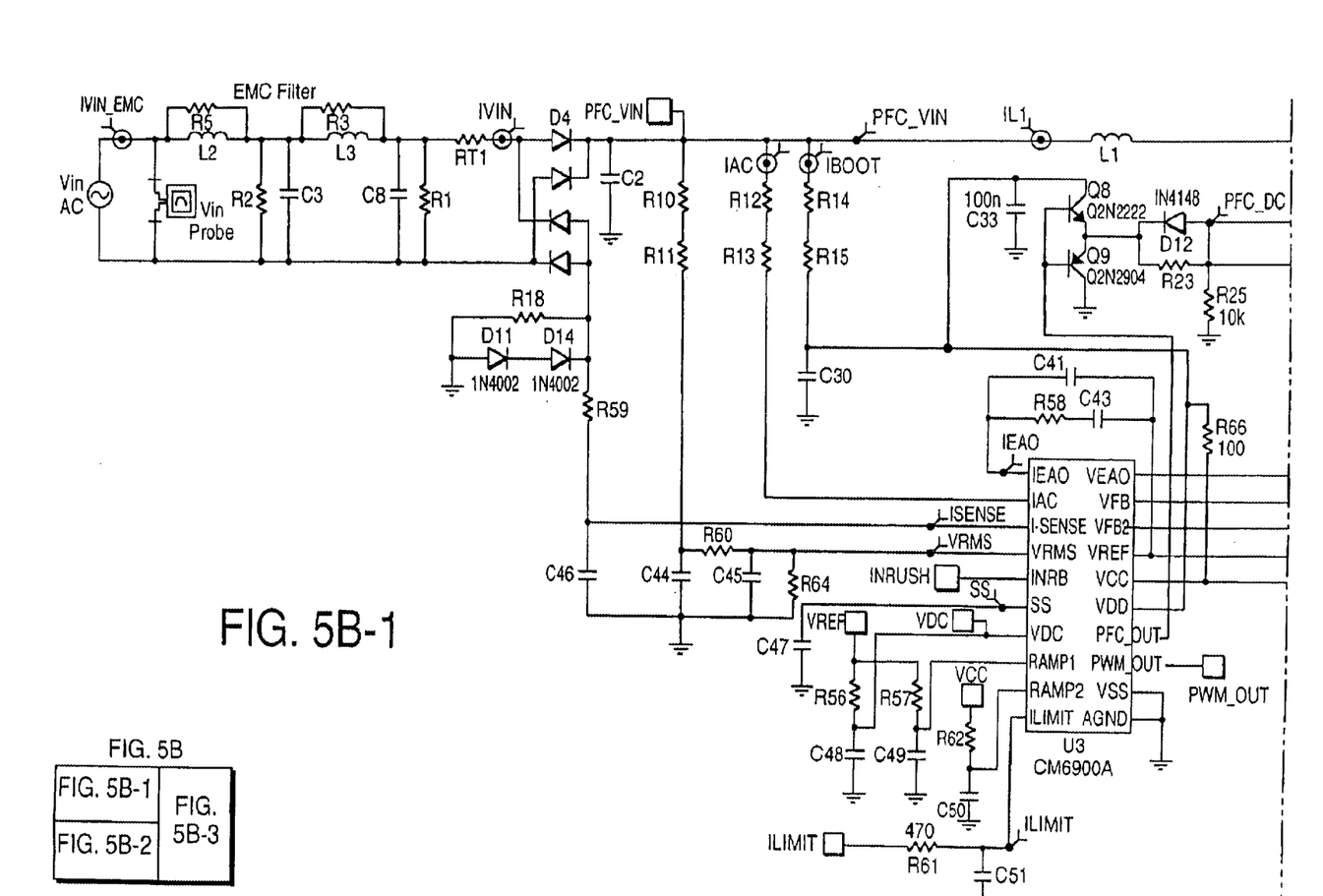
Figure 5B:
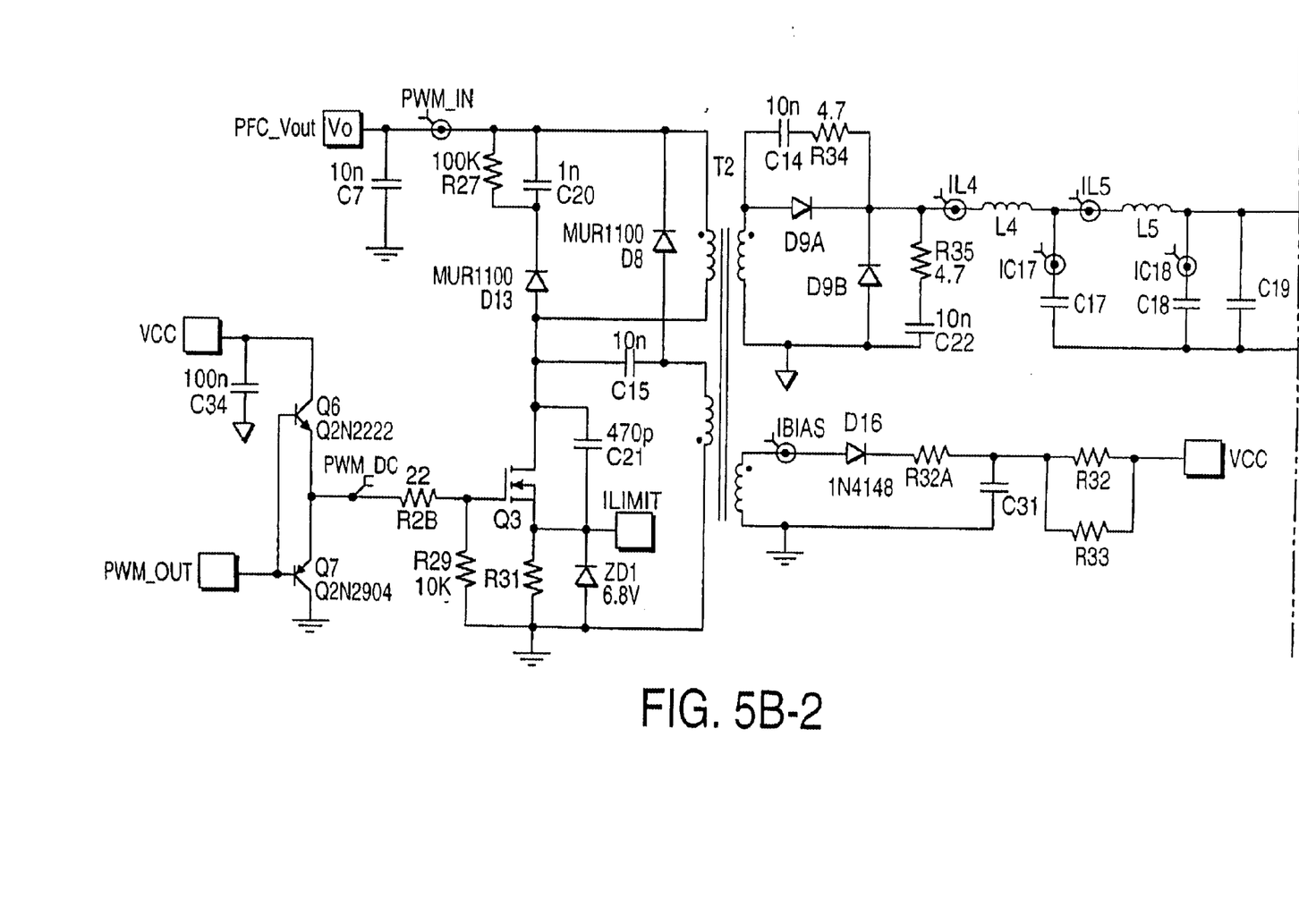
Figure 5B:
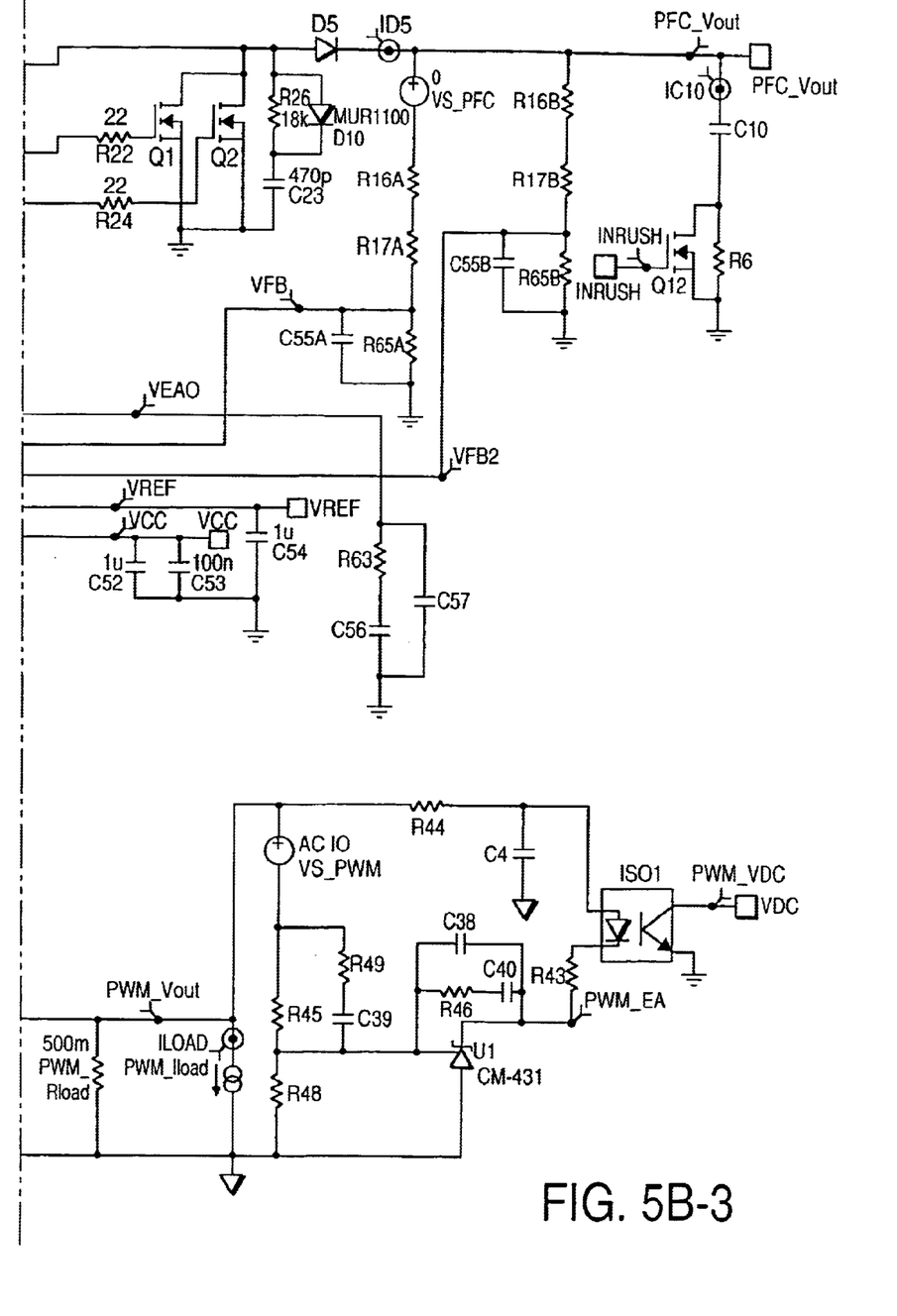

FIGS. 5a and 5b illustrate a schematic diagram of a two-stage power factor correction and pulse width modulation power converter in accordance with an aspect of the present invention. An example of such a power converter is available under part number CM6900 from Champion Microelectronic Corporation, located at 4020 Moorpark Avenue, Suite 105, San Jose, Calif.

Thus, while the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A switching power converter comprising:
   a switch for receiving an input current;
   a current sensor for forming a signal representative of the input current; and
   a controller for repeatedly opening and closing the switch for regulating an output voltage and when the input current exceeds a first threshold, operation of the main power switch is halted and when the input current exceeds a second threshold higher than the first threshold the input current is limited by a current-limiting resistance.

2. The power converter according to claim 1, wherein the controller performs power factor correction.

3. The power converter according to claim 2, wherein the controller power factor correction in accordance with average current-mode control.

4. The power converter according to claim 2, wherein the controller performs power factor correction in accordance with input current shaping.

5. The power converter according to claim 1, further comprising an output capacitor, wherein opening and closing the switch forms an output voltage across the output capacitor and wherein the current-limiting resistance is coupled in series with the output capacitor.

6. The power converter according to claim 5, wherein the current limiting resistance is coupled between the output capacitor and a ground node.

7. The power converter according to claim 5, further comprising a second switch coupled across the current-limiting resistance and when the input current does not exceed the second threshold, the second switch shorts the current-limiting resistance.

8. The power converter according to claim 1, further comprising a source for generating the input current and wherein the current-limiting resistance is coupled to receive a return current to the source.

9. The power converter according to claim 8, wherein the current-limiting resistance is coupled between a ground node and the source.

10. The power converter according to claim 8, wherein the current sensor comprises a sensing resistor coupled to receive the return current to the source and when the input current exceeds the second threshold, a second switch inhibits current from flowing in the sensing resistor.

11. A switching power supply for drawing power from a source and for forming an output voltage, the switching power supply comprising:
    a controller for controlling operation of a switch for modulating current from the source for forming the output voltage by alternately charging and discharging a reactive element;
    a bleed resistor for supplying current to the controller;
    a current-limiting resistor for limiting the current from the source; and
    wherein the current supplied to the controller via the bleed resistor is inhibited and the current-limiting resistor is shorted in response to a single control signal.

12. The switching power supply according to claim 11, wherein the current supplied to the controller via the bleed resistor is inhibited and the current-limiting resistor is shorted simultaneously.

13. The switching power supply according to claim 11, wherein the controller comprises an integrated circuit controller and wherein the single control signal is formed at a pin of the integrated circuit controller.

14. The power converter according to claim 11 wherein during start-up, the controller receives power from the bleed resistor and, after start-up, the controller receives power from a voltage supply for the controller.

15. The power converter according to claim 11, wherein the current-limiting resistor is shorted and the bleed current is through the bleed resistor is inhibited after the voltage supply exceeds a first predetermined voltage level and the input current is below a predetermined current level.

16. The power converter according to claim 11 wherein the current-limiting resistor is shorted and the bleed current through the bleed resistor is inhibited after either the voltage supply exceeds a first predetermined voltage level or the input current is below a predetermined current level.

17. The power converter according to claim 11, wherein the controller performs power factor correction.

18. The power converter according to claim 17, wherein the controller power factor correction in accordance with average current-mode control.

19. The power converter according to claim 17, wherein the controller performs power factor correction in accordance with input current shaping.

20. The power converter according to claim 11, further comprising an output capacitor, wherein opening and closing the switch forms an output voltage across the output capacitor and wherein the current-limiting resistance is coupled in series with the output capacitor.

21. The power converter according to claim 20, wherein the current-limiting resistance is coupled between the output capacitor and a ground node.

22. The power converter according to claim 20, further comprising a second switch coupled across the current-limiting resistance and when the input current does not exceed the second threshold, the second switch shorts the current-limiting resistance.

23. The power converter according to claim 11, wherein the current-limiting resistance is coupled to receive a return current to the source.

24. The power converter according to claim 23, wherein the current-limiting resistance is coupled between a ground node and the source.

25. The power converter according to claim 23, further comprising a current sensor including a sensing resistor coupled to receive the return current to the source and when the input current exceeds a threshold, a second switch inhibits current from flowing in the sensing resistor.

26. A switching power supply for drawing power from a source and for forming an output switching power supply comprising:

a controller for controlling operation of a switch for modulating current from the source for forming the output voltage by alternately charging and discharging a reactive element;

a bleed resistor for supplying current to the controller;

a current-limiting resistor for limiting the current from the source; and wherein the current supplied to the controller via the bleed resistor is inhibited and the current-limiting resistor is shorted simultaneously.

27. The switching power supply according to claim 26, wherein the controller comprises an integrated circuit controller and wherein the current supplied to the controller via the bleed resistor is inhibited and the current-limiting resistor is shorted in response to a control signal formed at a single pin of the integrated circuit controller.

28. The power converter according to claim 26, wherein during start-up, the controller receives power from the bleed resistor and, after start-up, the controller receives power from a voltage supply for the controller.

29. The power converter according to claim 26, wherein the current-limiting resistor is shorted and the bleed current is through the bleed resistor is inhibited after the voltage supply exceeds a first predetermined voltage level and the input current is below a predetermined current level.

30. The power converter according to claim 26, wherein the current-limiting resistor is shorted and the bleed current through the bleed resistor is inhibited after either the voltage supply exceeds a first predetermined voltage level or the input current is below a predetermined current level.

31. The power converter according to claim 26, wherein the controller performs power factor correction.

32. The power converter according to claim 31, wherein the controller performs power factor correction in accordance with average current-mode control.

33. The power converter according to claim 31, wherein the controller performs power factor correction in accordance with input current shaping.

34. The power converter according to claim 26, further comprising an output capacitor, wherein opening and closing the switch forms an output voltage across the output capacitor and wherein the current-limiting resistance is coupled in series with the output capacitor.

35. The power converter according to claim 34, wherein the current-limiting resistance is coupled between the output capacitor and a ground node.

36. The power converter according to claim 34, further comprising a second switch coupled across the current-limiting resistance and when the input current does not exceed the second threshold, the second switch shorts the current-limiting resistance.

37. The power converter according to claim 26, wherein the current-limiting resistance is coupled to receive a return current to the source.

38. The power converter according to claim 37, wherein the current-limiting resistance is coupled between a ground node and the source.

39. The power converter according to claim 37, further comprising a current sensor including a sensing resistor coupled to receive the return current to the source and when the input current exceeds a threshold, a second switch inhibits current from flowing in the sensing resistor.

* * * * *